US006813672B1

(12) United States Patent
Kamran et al.

(10) Patent No.: US 6,813,672 B1
(45) Date of Patent: Nov. 2, 2004

(54) EMC ENHANCEMENT FOR DIFFERENTIAL DEVICES

(75) Inventors: Bijan Kamran, Kenmore, WA (US); Warren S. Snyder, Snohomish, WA (US)

(73) Assignee: Cypress Semiconductor Corp., San Jose, CA (US)

(*) Notice: Subject to any disclaimer, the term of this patent is extended or adjusted under 35 U.S.C. 154(b) by 442 days.

(21) Appl. No.: 09/791,355

(22) Filed: Feb. 23, 2001

(51) Int. Cl.[7] .............................................. G06F 13/14
(52) U.S. Cl. ...................... 710/305; 710/100; 710/106; 710/63; 370/463
(58) Field of Search ................................ 710/100, 106, 710/300, 305, 63; 370/463; 340/500, 540; 326/101; 318/812; 324/500; 361/18, 90, 115, 119; 323/299, 304; 714/23; 375/220

(56) References Cited

U.S. PATENT DOCUMENTS

| 4,689,740 | A |   | 8/1987  | Moelands et al. ........... 364/200 |
|-----------|---|---|---------|-------------------------------------|
| 5,559,502 | A |   | 9/1996  | Schutte ................... 340/825.21 |
| 5,586,271 | A | * | 12/1996 | Parrett                             |
| 5,689,196 | A |   | 11/1997 | Schutte ......................... 326/86 |
| 5,937,201 | A | * | 8/1999  | Matsushita et al. ......... 713/310 |
| 5,963,057 | A | * | 10/1999 | Schmitt et al.                      |
| 6,012,103 | A |   | 1/2000  | Sartore et al. ................. 710/8 |
| 6,070,211 | A | * | 5/2000  | Neal et al.                         |
| 6,101,076 | A | * | 8/2000  | Tsai et al.                         |

FOREIGN PATENT DOCUMENTS

| WO | WO 96/17305 | 6/1996 | ........... G06F/13/40 |
| WO | WO 98/34376 | 8/1998 | ........... H04L/12/20 |
| WO | WO 99/09712 | 2/1999 | ........... H04L/12/40 |

OTHER PUBLICATIONS

"An intelligent IEEE 1394 hub architecture" by H. Yamamoto, K. Chikamura, T. Izumi, T. Onoye and Y. Nakamura (abstract only).*
"Improved sensitivity and security for distribution and feeder relays" by Schweitzer, E. O., III; Feltis, M. W.; Einewelhi, A.F. (abstract only).*
Universal Serial Bus (USB), Device Class Definition for Human Interface Devices (HID), Version 1.1, Apr. 7, 1999, pp. 1–87.
Universal Serial Bus Specification, Revision 1.1, Sep. 23, 1998, pp. 1–311.
Universal Serial Bus Specification, Revision 2.0, Apr. 27, 2000, pp. 1–622.

* cited by examiner

Primary Examiner—Gopal C. Ray
(74) Attorney, Agent, or Firm—Christopher P. Maiorana, P.C.

(57) ABSTRACT

An apparatus configured to communicate through a differential bus to a device. The apparatus may be configured to disconnect and reconnect the device in response to an abnormal reset event to provide enhanced electromagnetic compliance (EMC).

20 Claims, 4 Drawing Sheets

EMC ENHANCEMENT FOR DIFFERENTIAL DEVICES

FIELD OF THE INVENTION

The present invention relates to a method and/or architecture for implementing Universal Serial Bus (USB) peripheral devices generally and, more particularly, to a method and/or architecture for improving electromagnetic compliance (EMC) performance in a USB peripheral device.

BACKGROUND OF THE INVENTION

Universal Serial Bus (USB) devices normally need to be certified by standard regulatory bodies (FCC, CE, etc.) for electrical compliance before they can be sold in a particular market. In order for a USB device to pass the appropriate electromagnetic compliance (EMC) test, the device is subject to a few thousand volts of electromagnetic fast transient burst (EFTB) or electrostatic discharge (ESD) signals.

Conventional USB microcontrollers have internal analog circuits that resist a high degree of electrical disturbance. Additionally, board layout and external component selection of conventional USB microcontrollers influences overall EMC performance. However, if a vendor desires to certify a USB device at a tolerance that is well above the specification of the part, some type of technique must be incorporated into the device to accommodate such extreme conditions.

Conventional approaches for implementing EMC compliance include implementing external EMC suppressers. The external EMC suppressers are placed on data and supply lines of the USB microcontroller. Such suppressers provide a reliable way of handling unexpected electrical disturbances. However, such an approach increases the overall cost of the device since it requires additional parts external to the device.

It would be desirable to implement EMC compliance in a device without adding to the overall complexity and/or total cost of the device.

SUMMARY OF THE INVENTION

The present invention concerns an apparatus configured to communicate through a differential bus to a device. The apparatus may be configured to disconnect and reconnect the device in response to an abnormal reset event to provide enhanced electromagnetic compliance (EMC).

The objects, features and advantages of the present invention include providing a method and/or architecture for implementing electromagnetic compliance (EMC) in a device, such as a USB peripheral device, that may (i) allow a device vendor to improve the performance capabilities for ESD and/or EFTB events at no additional hardware cost; (ii) allow an end user to enjoy the benefits of a device that is less likely to fail when subjected to extreme electrical disturbances; (iii) provide improved EMC performance at no additional material cost; and/or (iv) allow vendors of USD devices to be able to produce more reliable devices without additional unnecessary costs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
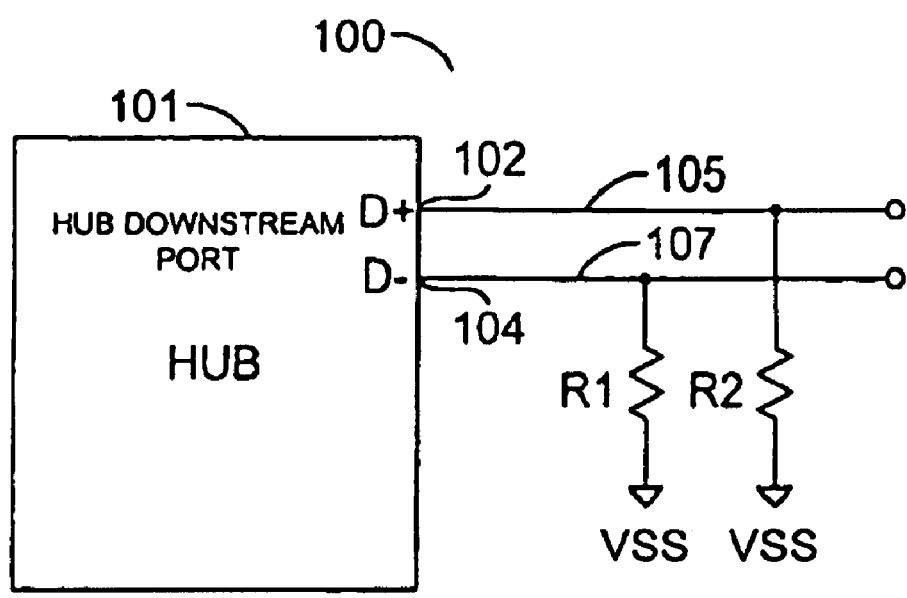
FIG. 1 is a block diagram of a preferred embodiment of the present invention.

Referring to FIG. 1, a block diagram of a circuit (or system) 100 is shown in accordance with a preferred embodiment of at the present invention. The circuit 100 may provide enhanced electromagnetic compliance (EMC) controlled in firmware. Specifically, the circuit 100 provides an enhancement to EMC behavior in firmware with no additional hardware components and/or cost.

The system 100 generally comprises a hub 101 with an input/output 102 and an input/output 104. The hub 101 may be implemented as a universal serial bus (USB) hub. The input/output 102 may present/receive a first data signal (e.g., D+) and the input/output 104 may present/receive a second data signal (e.g., D−). The data signals D+ and D− may be presented/received to the data lines 105 and 107 connected to the input/output 102 and the input/output 104, respectively. In one example, the data signal D+ and D− may be implemented as a differential signal pair. The data lines 105 and 107 may comprise USB data lines in a communication bus. Additionally, the data lines 105 and 107 may comprise a downstream port for the hub 101.

A resistor (e.g., R1) may be connected to the data line 107 between the input/output 104 (the D− line) and a ground voltage (e.g., VSS). A resistor (e.g., R2) may be coupled to the data line 105 between the input/output 102 (the D+ line) and the ground voltage VSS. The resistors R1 and R2 may be implemented as pull down resistors.

FIG. 1 illustrates the circuit 100 in a condition not connected to another device (e.g., a USB peripheral device). When no device is connected to the downstream port (e.g., the data lines D+/D−) of the hub 101, a single-ended "0" (e.g.,SE0) condition is sensed. A chip reset may be an event that halts a current operation, places the processor 158 in a predetermined state and causes the processor 158 to start executing code at a particular address (e.g., 0x0000). The reset condition which may or may not be caused by a USB bus reset, may also be referred to as a chip reset. In one example, chip reset in a USB microprocessors may comprise a power-on-reset and a watchdog reset. The SE0 condition may be sensed on the data signals D+/D− due to the pull down resistors R1 and R2. The hub 101 considers the SE0 condition as a no connection state.

Figure 2:
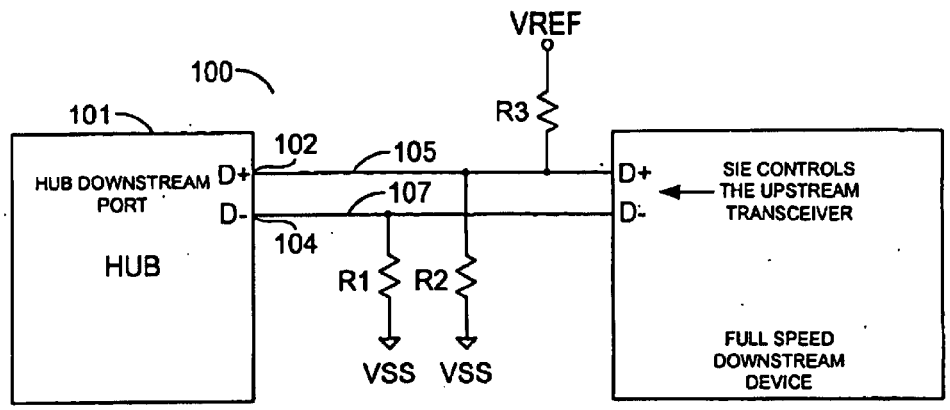
FIG. 2 is a block diagram of an implementation of the present invention.

Referring to FIG. 2, an example implementation of the system 100 is shown further comprising a downstream device 110. FIG. 2 illustrates normal operation of the device 110. The hub 101 may be connected to the downstream device 110 via the data lines 105 and 107. The downstream device 110 may control operation of the SE0 generation. The downstream device 110 may be, in one example, a full speed USB device. However, other devices may be implemented accordingly to meet the design criteria of a particular implementation. A serial interface engine (SIE) (within the downstream device 110, to be discussed in connection with
}

Figure 5:
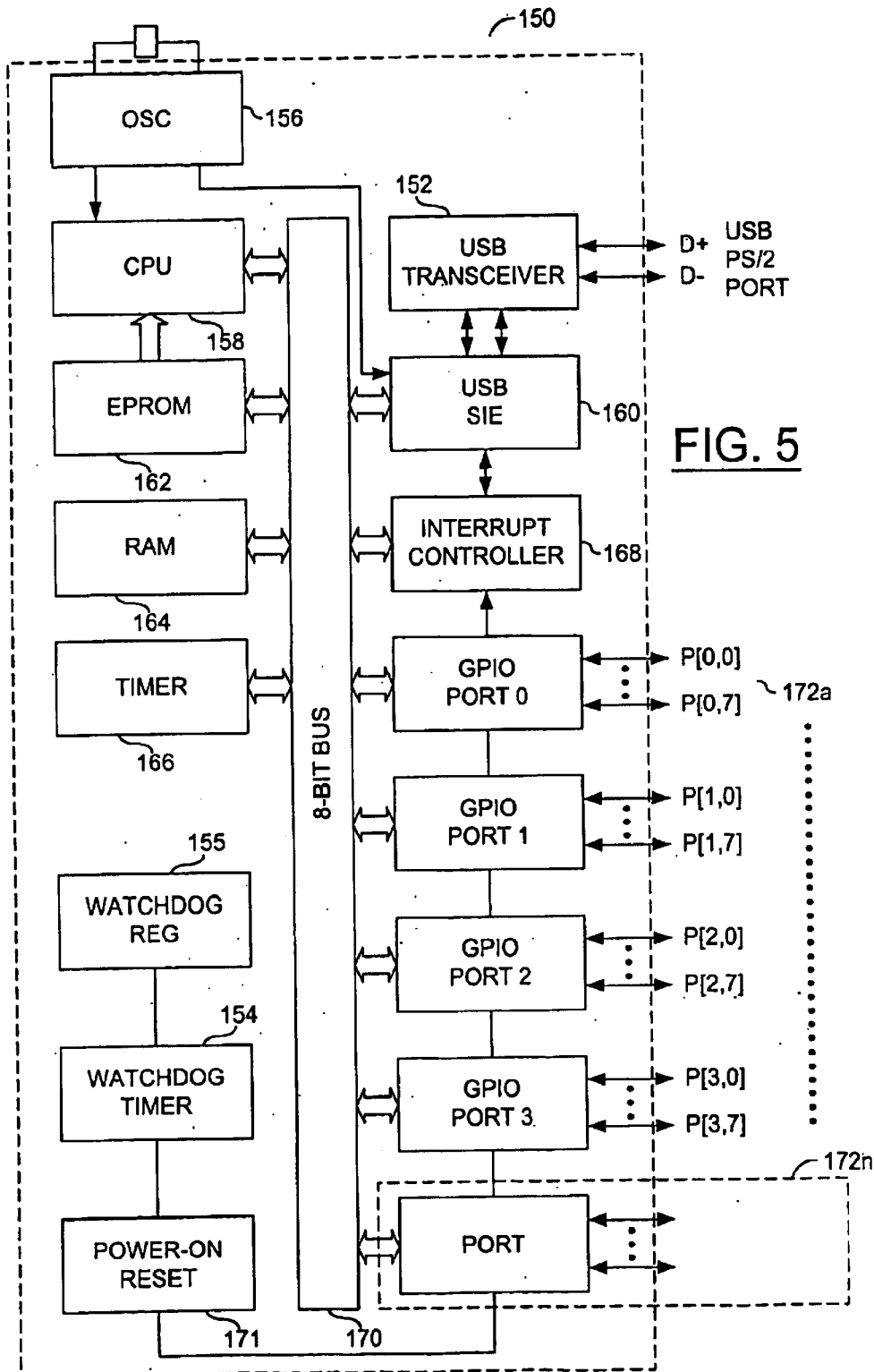
FIG. 5 is a detailed block diagram of a microcontroller in connection with the present invention.

FIG. 5) may control the upstream transceiver (e.g., the hub 101). The system 100 may implement an additional resistor (e.g., R3) connected between a supply voltage (e.g., VREF) and the data line 105 (the D+ line). The resistor R3 may be implemented as a pull up resistor. Alternatively, the supply voltage VREF and the resistor R3 may be coupled to the data line 107 (the D− line).

Figure 3:
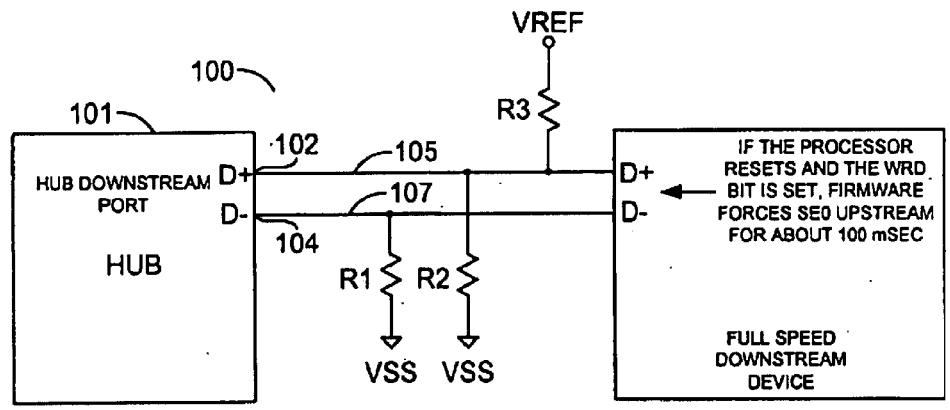
FIG. 3 is a block diagram of an implementation of the present invention.

Referring to FIG. 3, an example implementation of a forced electronic disconnection of the device 110 from the hub 101 is shown. The downstream device 110 may force the SE0 indication upstream if the firmware (to be discussed in connection with FIG. 5) is reset and a watchdog register bit (to be discussed in connection with FIG. 5) is set. A watchdog timer (to be discussed in connection with FIG. 5) may be implemented to trigger the SE0 generation. The downstream device 110 may force the SE0 condition upstream for a predetermined period of time.

If the downstream device 110 forces an SE0 condition on the data lines 105 and 107, the hub 101 acts as if the downstream device 110 is now disconnected, even though the pull up resistor R3 is permanently to connected.

Figure 4:
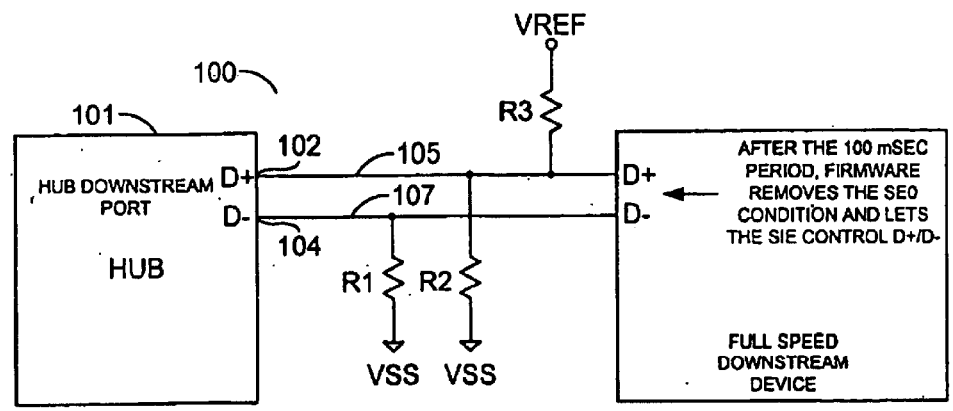
FIG. 4 is a block diagram of an implementation of the present invention.

Referring to FIG. 4, an example implementation of a re-connection (e.g., a re-enumeration) of the device 110 is shown. The downstream device 110 may be re-enumerated after removing the SE0 condition. An example of re-enumeration may be found in U.S. Pat. No. 6,012,103, which is incorporated by reference in its entirety. The downstream device 110 may control the operation of the SE0 generation. For example, after a period of time (e.g., preferably below 50–200 ms, more preferably between 75–150 ms, most preferably 100 ms), the downstream device 110 may remove the SE0 indication. The hub 101 may then detect a pull up on the data line 105 (or 107) via the resistor R3 and proceed to re-enumerate the re-connected device (e.g., the device 110). Thus, the downstream device 110 may then relinquish control of the data lines 105 and 107.

Referring to FIG. 5, a circuit 150 is shown. The circuit 150 may illustrate a microcontroller architecture of the present invention. In one example, the microcontroller 150 may be implemented as a USB microcontroller. The USB microcontroller 150 may have a watchdog function implemented in the watchdog timer 154. The circuit 150 may further store the firmware of the present invention. The circuit 150 generally comprises a transceiver block (or circuit) 152, a watchdog timer block (or circuit) 154, a register 155, an oscillator block (or circuit) 156, a processor (CPU) block (or circuit) 158, a serial interface engine (SIE) 160, a memory 162, a memory 164, a timer 166, an interrupt controller 168, a bus 170, a power-on-reset block (or circuit) 171, and a number of ports 172a–172n. The memory 162 may be implemented as an erasable and programmable read only memory (EPROM) or other appropriate memory. The content of the EPROM cannot be altered or affected by a loss of power. The various components communicate through the bus 170. The transceiver 152 receive data in a number of formats (e.g., USB, PS/2, etc.). The ports 172a–172n may be used to connect a number of peripheral devices.

The data input signals D+/D− may be presented to the SIE 160 through the transceiver 152. The watchdog timer 154 may then present a control signal to the CPU 158. The oscillator 156 may present a clock signal to the CPU 158 and the SIE 160.

If the watchdog register 155 is not written to on regular intervals (e.g., 8–16 ms), the microcontroller 150 may reset. A reset may be an event that halts a current operation, places the processor 158 in a predetermined state and causes the processor 158 to start executing code at the address 0x0000. A reset may also be referred to as a chip reset. In one example USB microprocessor may have a power-on-reset (171) and a watchdog reset (from the watchdog time 154). When the microcontroller 150 is reset, program execution may start at a ROM power-on-reset/watchdog-reset vector (e.g., a POR/WDR vector within the EPROM 162). A power-on-reset condition may be caused by the supply voltage VCC rising above an internally defined trip voltage, typically VCC/2 (e.g., an abnormal reset event). Upon such an event, the processor 158 is placed in a predetermined state. A watchdog reset condition may be caused if the watchdog register 155 is not written to during a particular interval. In one example, a minimum interval may be 8 ms. If an EFTB or an ESD event disturbs normal program execution, code execution may proceed to an unidentified location in the ROM 162. In such a case, the watchdog register 155 may not be initialized as expected.

A program counter of the CPU 158 may then move to the POR/WDR vector in order to execute appropriate POR/WDR code. A program counter may be an internal register which points to an address of a next instruction to be executed by the CPU 158. When the POR/WDR code is executed, firmware may poll the watchdog and POR bits of the status and control register 155 to identify the cause of the reset. If the firmware identifies that the reset was caused by a watchdog event, the SE0 indication is forced upstream and released to prompt re-enumeration of the device. Specifically, SE0 may be forced upstream for period of 100 ms. The 100 ms period may ensure that the SE0 forcing is correctly detected by the upstream hub 101 as a disconnect event such that re-enumeration may occur.

Once the SE0 indication is removed, the upstream hub 101 may sense the pull up on the data line 105 (or 107). The pull up on the data line 105 (or 107) may be interpreted as a new connection to the downstream port 105 and 107. The hub 101 may then report the new connection (or re-connection) to the host of the hub 101 and proceed to enumerate (or re-enumerate) the downstream device 110.

Figure 6:
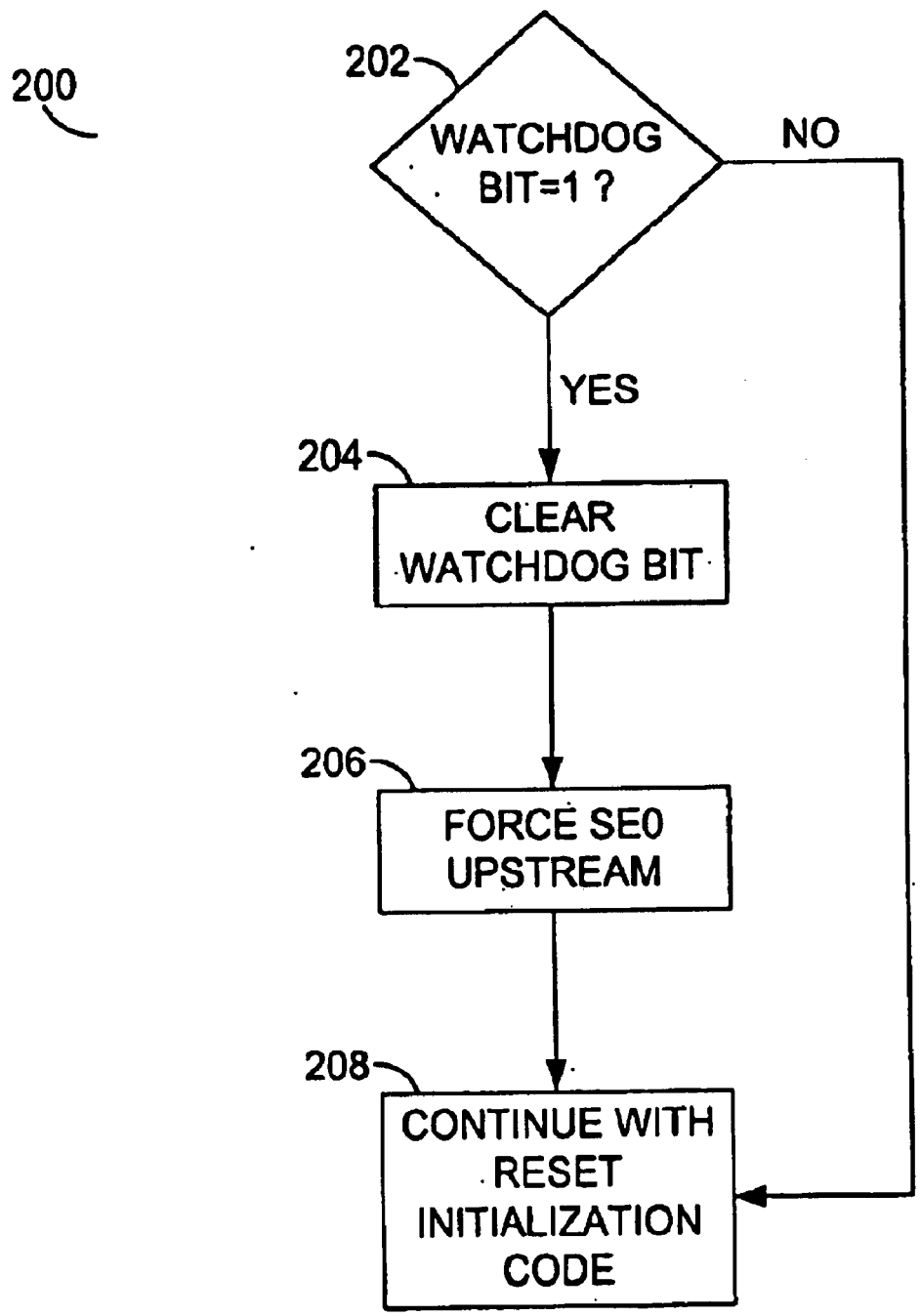
FIG. 6 is a flow chart illustrating an operation of the present invention.

Referring to FIG. 6, a method (or process) 200 illustrating an operation of the present invention is shown. The process 200 may illustrate an operation the firmware of the downstream device 110. The firmware process 200 may control the operation (or generation) of the SE0 indication. The process 200 generally comprises a decision state 202, a state 204, a state 206 and a state 208. The decision state 202 may determine if a watchdog bit of the register 155 is at a predetermined state. A particular polarity of the watchdog bit may be altered in order to meet the criteria of a particular implementation. If the watchdog bit is at the predetermined state, the process 200 may continue to the state 204. The state 204 may clear the watchdog bit. The process 200 may then continue to the state 206. The state 206 may force the SE0 indication upstream. The process 200 may then continue to the state 208. The state 208 may continue with the reset initialization code of the firmware 150. Referring back to the decision state 202, if the watchdog bit is not at the predetermined state the process 200 may continue directly to the state 208.

Once the content of the program counter is corrupted as a result of an unexpected electromagnetic disturbance, the watchdog register 155 may not get properly initialized. The processor 158 may then be reset (e.g., at the state 206) and the code execution may start at a reset address (e.g., at the state 208). The firmware 150 may control such execution after a reset event. If an electrical transient occurs such that normal flow of the system 100 is disturbed, the watchdog timer 154 and the firmware 150 may simulate a connect/disconnect event to the hub 101, thereby re-enumerating the device 110.

An example micro code of the present invention is shown as follows:

```
POR_WDR_Reset:
    iord    FFh             ; Read Processor Status and Control Register
    and     a, 10h          ;
    jz      POR_Reset       ; If POR bit is set, reset was caused
                              by a POR event skip forcing
    iord    1Fh             ; Read USB Status and Control Reg and
                              preserve bits [3:7]
    and     A, F8h          ; or A, 03
    iowr    1Fh             ; Force SE0 upstream
    mov     X, 175          ; Initialize delay counters
.lpo: mov   A, 255          ; [4] cycles
.lpi: iowr  26h             ; [5] cycles
    iowr    26h             ; [5] cycles
    iowr    26h             ; [5] cycles
    dec     A               ; [4] cycles
    jnz     .lpi            ; [5] cycles -> Total/one cycle = 28 cycles.
                            ; Delay/one inner loop = 28 * 255 * 83.33
                            nsec ~= 595 us
    dec     X               ;
    jnz     .
lpo                         ; Total delay = 175 inner loop * 595 usec/inner
                              loop ~= 105 msec
    iord    1Fh             ;
    and     A, F8h          ;
    iowr    1Fh             ; Replace upstream to non-forcing
POR_Reset:
```

Upon a reset event, the microcontroller 150 may start executing at ROM address 0x0000. The firmware 150 may then examine the contents of the processor status and control register 155 (at the address 0xFF). If the watchdog bit (e.g., bit 6) of the status and control register 155 is set, the firmware 150 may conclude that a watchdog event caused the reset and not a power-on-reset. If the watchdog reset bit is not set, the firmware 150 may take no action and proceed with the reset initialization code. If the watchdog reset bit is set, the firmware 150 may perform the following:

A) force the SE0 state: When the downstream device 110 forces the SE0 state upstream, the upstream hub 100 "thinks" that the device is no longer connected to the downstream port. The SE0 state may be forced for a duration of at least 10 ms;

B) remove the SE0 indication: Once the firmware 150 removes the SE0 state, the pull up resistor R3 on the data line 105 (or 107) raises above a predetermined threshold voltage level and the upstream host senses a new device connection to the downstream port;

C) the hub 101 may then report the new connection to the host. The host may send a request to the hub 101 to propagate reset signaling (a SE0 state for more than 2.5 ms) to the downstream device 110; and D) after the termination of the reset signaling, the host may proceed to enumerate and to configure the downstream device 110.

The present invention may have a number of alternative approaches and variations of implementation. A first approach may be to implement an external voltage suppresser to limit the disturbances passed on to the microcontroller 150.

A second approach may allow the firmware to turn off an external switch, (e.g., a MOSFET transistor not shown) to electrically disconnect the pull up resistor R3, when a watchdog event occurs. The watchdog event may be seen as a disconnect event by the upstream hub 101. After a period of time (e.g., 100 ms) the firmware may turn the external switch on and electrically reconnect the pull up resistor R3 to the data line 105 (or 107). The event is generally then seen as a new connection by the upstream hub 101. A re-enumerating of the re-connected device 110 may result. However, each of the alternative approaches may require external (or additional) hardware, increasing the cost of the final product.

The system 100 has been described in connection with USB full speed devices. However, the system 100 is applicable to low, full, and high speed USB devices. The system 100 may provide a zero cost method for a noise persistent recovery mechanism. Specifically, the system 100 may provide enhanced EMC protection for USB peripheral devices in firmware.

The USB device may be compliant with the USB specification version 1.0 (published November 1996), the USB specification version 1.1 (published September 1998), and/or the USB specification version 2.0 (published April 2000), each of which are hereby incorporated by reference in their entirety. The USB specifications state that a short circuit condition between the data lines 105 and 107 to either VCC or GND must be tolerated by a USB compliant transceiver. The USB tolerances allow the present invention to provide a disconnect and re-connect enabling the re-enumeration process.

The system 100 may improve overall system reliability for the end user at no additional cost. Additionally, the system 100 may effectively recover from a catastrophic crash. However, the system 100 may not necessarily replace EMC detection devices since the devices may be needed for other purposes.

The system 100 may allow the downstream device 110 to be placed in an unknown state (e.g., a naturally not functional state) and re-enumerated by the host to resume normal operation. The system 100 may allow a device vendor to improve the performance of a device to ESD or EFTB events at no additional system cost. As a result, the end user will enjoy the benefits of a device that is less likely to fail when subjected to extreme electrical disturbances. By providing improved EMC performance at no additional material cost, the vendors of USB devices will be able to produce more reliable devices for the end user without burdening the customers with additional unnecessary costs.

The circuit 100 may improve the performance of USB devices against electromagnetic compliance tests, with no additional cost to the end user. The circuit 100 may greatly improve the performance of USB microcontrollers when they are exposed to electromagnetic radiation or electrostatic discharge (ESD), at absolutely no cost to the end user. The circuit 100 may provide such performance through firmware as described in connection with FIGS. 5 and 6.

The function performed by the flow diagram of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a circuit configured to (i) communicate through a differential bus to a device comprising a hub and (ii) execute firmware configured to disconnect and reconnect said circuit to said device in response to an abnormal reset event to provide enhanced electromagnetic compliance (EMC), wherein said apparatus is configured to communicate with said device through a downstream port.

2. The apparatus according to claim 1, wherein said abnormal reset event comprises a single ended zero signal.

3. The apparatus according to claim 1, wherein said device is configured to generate said abnormal reset event.

4. The apparatus according to claim 1, wherein said device is configured to generate said abnormal reset event in response to a predetermined criteria.

5. The apparatus according to claim 1, wherein one line of said differential bus is coupled to a reference voltage through a pull up resistor.

6. The apparatus according to claim 1, wherein both lines of said differential bus are coupled to a ground voltage through a first and second pulldown resistor.

7. The apparatus according to claim 1, wherein said apparatus is configured to operate when subjected to extreme electrical disturbances without implementing external hardware.

8. The apparatus according to claim 1, wherein said apparatus is configured to improve performance of said device to electrostatic discharge (ESD) or electromagnetic fast transmit burst (EFTB) events.

9. The apparatus according to claim 1, wherein said device comprises a Universal Serial Bus (USB) peripheral device.

10. The apparatus according to claim 1, wherein said apparatus comprises a Universal Serial Bus (USB) hub.

11. The apparatus according to claim 1, wherein said device comprises firmware configured to execute code to control said disconnect and reconnect.

12. An apparatus comprising:
    means for communicating through a differential bus to a device;
    means for disconnecting from said device; and
    means for reconnecting said device in response to an abnormal reset event to provide enhanced electromagnetic compliance (EMC), wherein said apparatus (i) comprises a hub and (ii) is configured to communicate with said device through a downstream port.

13. A method for providing enhanced EMC performance in a device, comprising the steps of:
    (A) generating a zero signal indicating an abnormal reset event in response to a predetermined criteria;
    (B) communicating through a differential bus to said device; and
    (C) disconnecting and reconnecting said device in response to said abnormal reset event, wherein said device (i) comprises a hub and (ii) is configured to communicate through a downstream port.

14. The method according to claim 13, wherein step (A) further comprises:
    connecting at least one line of said differential bus to a reference voltage through a pull up resistor.

15. The method according to claim 13, wherein step (A) further comprises:
    connecting both lines of said differential bus to a ground voltage through a first and second pulldown resistor.

16. The method according to claim 13, further comprising the step of:
    improving performance of said device to ESD or EFTB events.

17. The method according to claim 13, wherein said device comprises a Universal Serial Bus (USB) peripheral device.

18. An apparatus comprising:
    a circuit configured to (i) communicate through a differential bus to a device comprising a Universal Serial Bus hub and (ii) execute firmware configured to disconnect and reconnect said circuit to said device in response to an abnormal reset event to provide enhanced electromagnetic compliance (EMC), wherein said apparatus is configured to communicate with said hub through a downstream port.

19. An apparatus comprising:
    a circuit configured to (i) communicate through a differential bus to a device comprising a Universal Serial Bus peripheral device and (ii) execute firmware configured to disconnect and reconnect said circuit to said device in response to an abnormal reset event to provide enhanced electromagnetic compliance (EMC), wherein said apparatus is configured to communicate with said device through a downstream port.

20. A method for providing enhanced EMC performance in a device, comprising the steps of:
    (A) generating a zero signal indicating an abnormal reset event in response to a predetermined criteria;
    (B) communicating through a differential bus to said device;
    (C) disconnecting and reconnecting said device in response to said abnormal reset event, wherein said device comprises a Universal Serial Bus (USB) peripheral device; and
    (D) communicating with said device through a downstream port.

* * * * *